(12) United States Patent
Sakata

(10) Patent No.: US 10,033,802 B2
(45) Date of Patent: Jul. 24, 2018

(54) INFORMATION PRESENTING METHOD

(71) Applicant: Panasonic Intellectual Property Corporation of America, Torrance, CA (US)

(72) Inventor: Kotaro Sakata, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 513 days.

(21) Appl. No.: 14/645,413

(22) Filed: Mar. 11, 2015

(65) Prior Publication Data

US 2015/0278399 A1 Oct. 1, 2015

(30) Foreign Application Priority Data

Mar. 28, 2014 (JP) .................. 2014-068653

(51) Int. Cl.
*G06F 7/00* (2006.01)
*H04L 29/08* (2006.01)

(52) U.S. Cl.
CPC ........ *H04L 67/1002* (2013.01); *H04L 67/325* (2013.01)

(58) Field of Classification Search
CPC ............................ G06Q 10/10; G06Q 10/109
USPC ................... 715/744, 772; 708/109
See application file for complete search history.

(56) References Cited

U.S. PATENT DOCUMENTS

| | | | | |
|---|---|---|---|---|
| 5,615,138 A | * | 3/1997 | Tanaka ................... | G06Q 10/06 700/108 |
| 5,642,303 A | * | 6/1997 | Small ...................... | G01S 1/68 708/109 |
| 6,035,278 A | * | 3/2000 | Mansour ................ | G06Q 10/02 705/5 |
| 2002/0065836 A1 | * | 5/2002 | Sasaki ............... | G06F 17/30507 |
| 2006/0009702 A1 | * | 1/2006 | Iwaki ...................... | A61B 5/00 600/520 |
| 2006/0247542 A1 | * | 11/2006 | Watanabe ................ | A61B 5/16 600/500 |
| 2008/0046286 A1 | * | 2/2008 | Halsted ................ | G06F 19/322 705/2 |
| 2009/0164252 A1 | * | 6/2009 | Morris ................... | G06Q 10/00 705/3 |
| 2012/0158293 A1 | * | 6/2012 | Burnham ............... | G01C 21/20 701/439 |
| 2012/0158422 A1 | * | 6/2012 | Burnham ............... | G06Q 10/00 705/2 |

(Continued)

FOREIGN PATENT DOCUMENTS

JP 2003-271634 9/2003

*Primary Examiner* — Cheyne D Ly
(74) *Attorney, Agent, or Firm* — Greenblum & Bernstein, P.L.C.

(57) ABSTRACT

An information presenting method of providing presentation information to a terminal apparatus includes acquiring user schedule information in which at least one event is registered by a user for each date and time; searching for a free time after a current time, in which no event is registered, on the basis of the user schedule information; and generating the presentation information including information indicating a benefit which the user is capable of receiving in the free time in a facility that provides a service and transmitting the presentation information to the terminal apparatus at a timing when the free time starts.

4 Claims, 11 Drawing Sheets

(56) References Cited

U.S. PATENT DOCUMENTS

| | | | |
|---|---|---|---|
| 2012/0227005 A1* | 9/2012 | Anton | G06Q 10/109 715/772 |
| 2013/0159041 A1* | 6/2013 | Jayaraman | A61B 5/18 705/7.15 |
| 2014/0337751 A1* | 11/2014 | Lim | G06Q 10/109 715/744 |

* cited by examiner

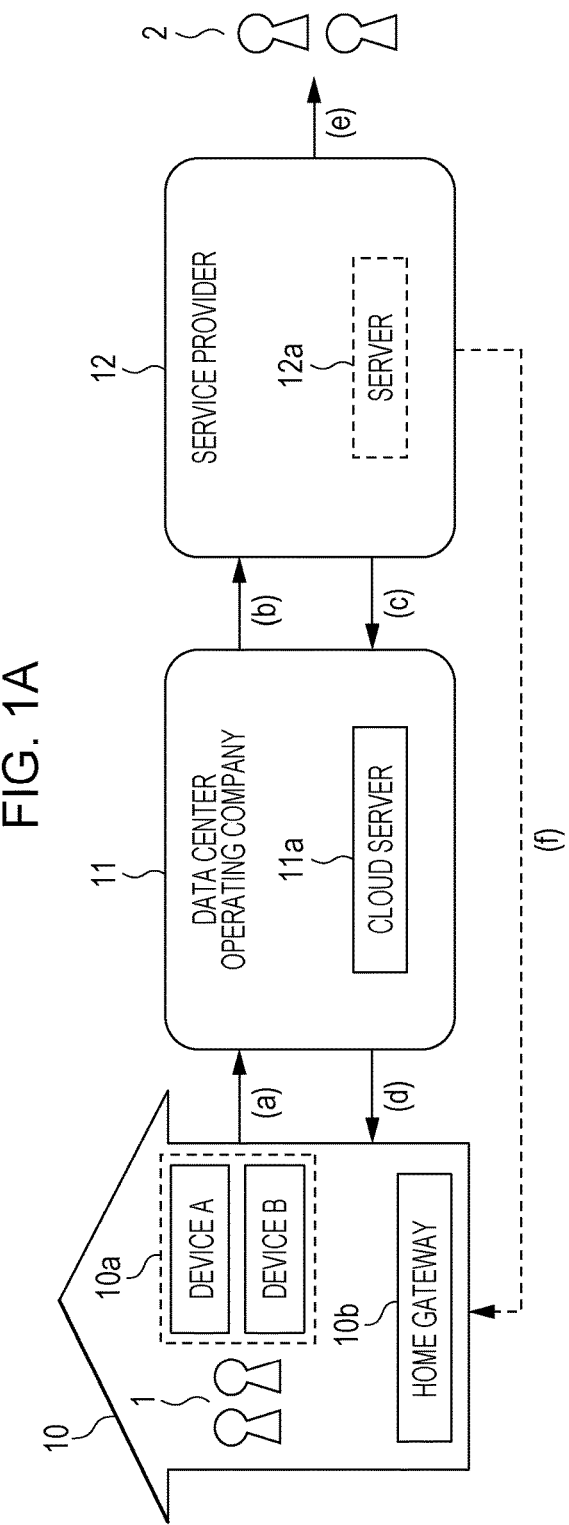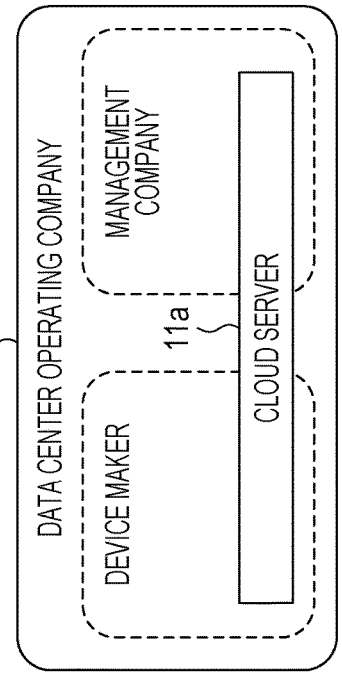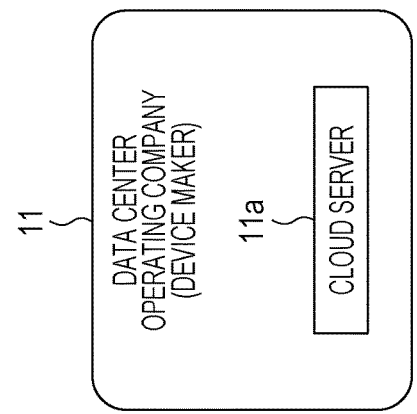

FIG. 5

| SHOP NAME | CONTENT OF COUPON | MASSAGER NAME | IMAGE NAME | SHOP FREE TIME | | | |
|---|---|---|---|---|---|---|---|
| Manhattan MIXI | US$300 DISCOUNT | BROWN | aaa.jpg | FEB. 15 14:00 TO 16:00 | FEB. 16 10:30 TO 13:00 | FEB. 17 16:00 TO 19:00 | ⋮ |
| | | JAMES | bbb.jpg | FEB. 15 10:00 TO 12:00 | FEB. 15 17:00 TO 19:30 | FEB. 16 14:00 TO 16:00 | ⋮ |
| | | ⋮ | ⋮ | ⋮ | ⋮ | ⋮ | |

INFORMATION PRESENTING METHOD

BACKGROUND

1. Technical Field

The present disclosure relates to an information presenting method of presenting information in accordance with a schedule of a user.

2. Description of the Related Art

A technology in the related art is known, in which a date and time (free time) when no specific event is registered is extracted from schedule information about a user and a proposition of an action in the free time is made on the basis of the preference and the current position of the user (for example, refer to Japanese Unexamined Patent Application Publication No. 2003-271634).

However, further improvement is required in Japanese Unexamined Patent Application Publication No. 2003-271634.

SUMMARY

In one general aspect, the techniques disclosed here feature an information presenting method of providing presentation information to a terminal apparatus. The information presenting method includes acquiring user schedule information in which at least one event is registered by a user for each date and time; searching for a free time after a current time, in which no event is registered, on the basis of the user schedule information; and generating the presentation information including information indicating a benefit which the user is capable of receiving in the free time in a facility that provides a service and transmitting the presentation information to the terminal apparatus at a timing when the free time starts.

These general and specific aspects may be implemented using a system, a method, and a computer program, and any combination of systems, methods, and computer programs.

With the above aspect, it is possible to realize further improvement.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 1A to 1C schematically illustrate an information presenting system according to an embodiment of the present disclosure;

FIG. 5 illustrates exemplary shop schedule information according to the embodiment of the present disclosure;

Figure 2:
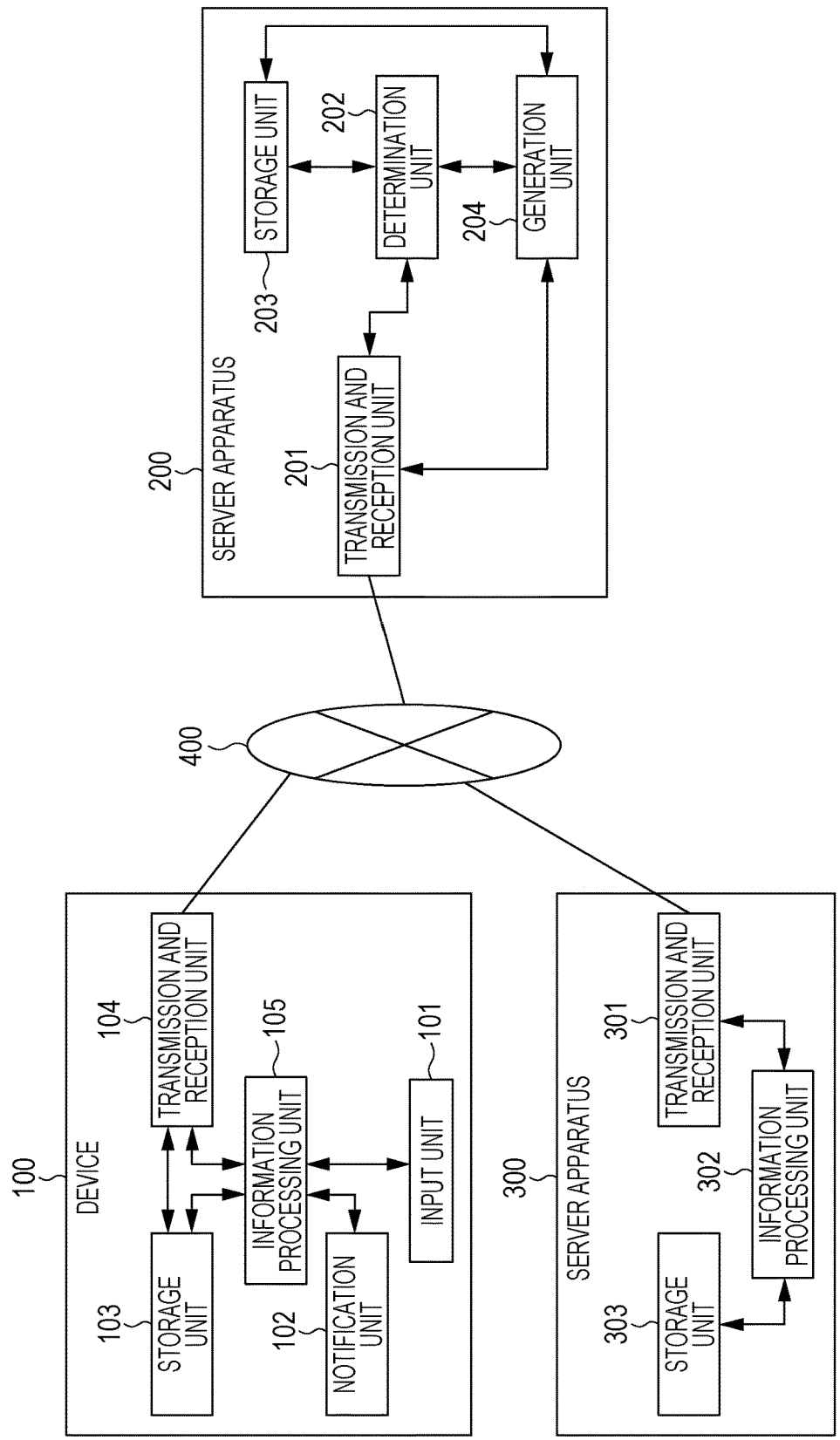
FIG. 2 is a block diagram illustrating an exemplary configuration of the information presenting system according to the embodiment of the present disclosure.

DETAILED DESCRIPTION (Underlying Knowledge Forming Basis of the Present Disclosure)

The inventor has found that the following problems occur with the technology described in Japanese Unexamined Patent Application Publication No. 2003-271634.

In Japanese Unexamined Patent Application Publication No. 2003-271634, the preference and the current position of the user are considered in the proposition of the action in the free time to the user. However, the technology in Japanese Unexamined Patent Application Publication No. 2003-271634 has a problem in that direct information presentation from a facility for prompting the user to perform the action in the free time is not considered. In addition, the technology in Japanese Unexamined Patent Application Publication No. 2003-271634 also has a problem in that the action in the free time is not proposed, which is based on the degree of fatigue caused by the degree of tightness of the schedule of the user and/or the degree of fatigue estimated from the physical and mental condition of the user.

Accordingly, the inventor proposes the following improvement in order to address the above problems.

(1) According to an aspect of the present disclosure, an information presenting method of providing presentation information to a terminal apparatus includes acquiring user schedule information in which at least one event is registered by a user for each date and time; searching for a free time after a current time, in which no event is registered, on the basis of the user schedule information; and generating the presentation information including information indicating a benefit which the user is capable of receiving in the free time in a facility that provides a service and transmitting the presentation information to the terminal apparatus at a timing when the free time starts.

According to this aspect, the information about the benefit in the facility is presented to the user in accordance with the convenience of the user. Accordingly, the facility that provides the service is capable of easily prompting the user to perform the action to receive the service.

(2) In the above aspect, the information presenting method may include calculating a degree of tightness of a schedule during a certain period on the basis of the user schedule information; determining whether the degree of tightness is higher than or equal to a threshold value; and generating the presentation information about a facility that provides a service for relieving fatigue if the degree of tightness is higher than or equal to the threshold value.

According to this aspect, the calculation of the degree of tightness of the schedule allows the degree of fatigue of the user to be estimated to present the information appropriate for the degree of fatigue. In other words, since the information about the facility that provide the service for relieving the fatigue is presented when it is determined that the degree of fatigue is high, the facility that provides the service is capable of more easily prompting the user to perform the action to receive the service.

(3) In the above aspect, the at least one event may include multiple events. The information presentation method may include determining whether each event registered in the certain period in the user schedule information belongs to a first event or a second event using information indicating whether each of the events belongs to the first event or the second event, wherein it is predetermined that the first event indicates an event causing fatigue and the second event indicates an event causing no fatigue; calculating a first total time of the first events and a second total time of the second events; and calculating the degree of tightness by adding a first multiplication value resulting from assignment of a first value to the first total time to a second multiplication value resulting from assignment of a second value lower than the first value to the second total time.

According to this aspect, it is possible to calculate the degree of tightness of the schedule in more detail.

(4) In the above aspect, the information presenting method may include acquiring a medical measurement value indicating a physical or mental state of the user from a certain apparatus; determining whether the medical measurement value is higher than or equal to a threshold value; and generating the presentation information about a facility that provides a service for relieving fatigue if the medical measurement value is higher than or equal to the threshold value.

According to this aspect, the degree of fatigue of the user is estimated with the medical measurement value and it is possible to present the information appropriate for the degree of fatigue. In other words, since the information about the facility that provide the service for relieving the fatigue is presented when it is determined that the degree of fatigue is high, the facility that provides the service for relieving the fatigue is capable of more easily prompting the user to perform the action to receive the service.

(5) In the above aspect, the medical measurement value may include at least any of an amount of activity, a stress level, a blood pressure level, and a heart rate.

According to this aspect, the degree of fatigue of the user is estimated with the medical measurement value and it is possible to present the information appropriate for the degree of fatigue.

(6) In the above aspect, the information presenting method may include searching for a time period in which the free time that is searched for from the user schedule information is overlapped with an available free time in the facility providing the service for a certain time or more using facility schedule information indicating the free time and the available free time; and generating the presentation information including the information indicating the benefit for the service which the user is capable of receiving in the facility during the time period.

According to this aspect, the information is presented during the time period in which the user is capable of reliably receiving the service. Accordingly, no waste of time occurs for both the user and the facility.

(7) In the above aspect, the information presenting method may include acquiring user position information indicating a current position of the user; searching for facility position information indicating a position of the facility existing in a certain area around the current position of the user using the user position information; and searching for the time period for the facility indicated by the facility position information.

According to this aspect, it is possible to present the information about the facility which the user is capable of accessing.

(8) In the above aspect, the facility that provides the service for relieving the fatigue may include a massage shop.

According to this aspect, it is possible to present the information about the optimal facility that provides the service for relieving the fatigue of the user.

Embodiments of the present disclosure will herein be described in detail with reference to the attached drawings.
<Overview of how Service is Provided>

An overview of how a service is provided according to an embodiment will now be described with reference to FIGS. 1A to 1C. FIGS. 1A to 1C schematically illustrate an information presenting system in the present embodiment. FIG. 1A illustrates an overview of the information presenting system in the present embodiment.

Referring to FIG. 1A, a group 10 is, for example, a company, a group, or a family and the size of the group 10 is not specifically limited. Multiple devices 10a (for example, a device 100 described below) and a home gateway 10b exist in the group 10. The multiple devices 10a include a device A and a device B.

Each of the multiple devices 10a is a device (for example, a smartphone, a tablet, a personal computer (PC), or a television (TV) set) connectable to the Internet. However, the multiple devices 10a may be connectable to the Internet via the home gateway 10b even if the devices 10a are not directly connectable to the Internet. A user 1 who uses the multiple devices 10a exists in the group 10. The user 1 is, for example, a staff or a client in a facility (for example, a massage shop) providing a relaxation service.

A data center operating company 11 includes a cloud server 11a. The cloud server 11a is a virtual server that works together with various devices via the Internet. The data center operating company 11 performs, for example, data management, management of the cloud server 11a, and operation of a data center that performs the data management and the management of the cloud server 11a. The services provided by the data center operating company 11 will be described in detail below.

The data center operating company 11 is not limited to a company that performs only the data management, the management of the cloud server 11a, and so on. For example, when a device maker that develops and manufactures one device, among the multiple devices 10a, also performs the data management, the management of the cloud server 11a, and so on, the device maker corresponds to the data center operating company 11 (refer to FIG. 1B).

The data center operating company 11 is not limited to one company. For example, when a device maker and another management company cooperatively perform or share the data management, the management of the cloud server 11a, and so on, both or either of the device maker and the other management company corresponds to the data center operating company 11 (refer to FIG. 1C).

A service provider 12 includes a server 12a. Multiple different servers 12a may be provided for different purposes (for example, a server apparatus 200 and a server apparatus 300 described below).

The home gateway 10b is not necessarily provided in the above service. For example, when the cloud server 11a exclusively performs the data management, it is not necessary to provide the home gateway 10b. No device that is not directly connectable to the Internet may exist, as in a case in which all the devices in the group 10 are connected to the Internet.

An exemplary flow of information in the above service will now be described. First, each of the device A and the device B in the group 10 transmits information (for example, user schedule information, user position information, shop schedule information, and shop position information which are described below) to the cloud server 11*a* in the data center operating company 11. The cloud server 11*a* accumulates the information from the device A or the device B (refer to (a) in FIG. 1A).

The above information may be directly provided from the multiple devices 10*a* to the cloud server 11*a* via the Internet. Alternatively, the above information from the multiple devices 10*a* may be temporarily accumulated in the home gateway 10*b* and may be provided from the home gateway 10*b* to the cloud server 11*a*.

Then, the cloud server 11*a* in the data center operating company 11 supplies the accumulated information to the service provider 12 in certain units. The certain unit may be a unit in which the data center operating company 11 is capable of organizing the accumulated information and supplying the organized information to the service provider 12 or a unit requested by the service provider 12. The information may not be supplied in the certain units and the amount of supplied information may be varied depending on the status.

The information accumulated in the cloud server 11*a* is stored in the server 12*a* in the service provider 12, if needed (refer to (b) in FIG. 1A). The service provider 12 organizes the stored information into information (for example, presentation information described below) matched with the service to be provided to the user and provides the organized information to the user. The user to which the information is provided may be the user 1 using the multiple devices 10*a* or a user 2 outside the group 10.

The service may be directly provided from the service provider 12 to the user (refer to (f) and (e) in FIG. 1A) or may be provided from the service provider 12 to the user via the cloud server 11*a* in the data center operating company 11 again (refer to (c) and (d) in FIG. 1A). Alternatively, the cloud server 11*a* in the data center operating company 11 may organize the accumulated information into information matched with the service to be provided to the user and may supply the organized information to the service provider 12.

The user 1 may be equal to the user 2 or may be different from the user 2.

<Configuration of Information Presenting System>

An exemplary configuration of the information presenting system according to the present embodiment will now be described with reference to FIG. 2. FIG. 2 is a block diagram illustrating the exemplary configuration of the information presenting system of the present embodiment.

As illustrated in FIG. 2, the information presenting system includes the device 100, the server apparatus 200, and the server apparatus 300.

Referring to FIG. 2, the device 100 is connected to the server apparatus 200 via a network 400. The server apparatus 300 is connected to the server apparatus 200 via the network 400. The network 400 may be a wireless network, a wired network, or a network including both the wireless network and the wired network.

Although only one device 100 is illustrated in FIG. 2, two or more devices 100 may be provided.

An exemplary configuration of the device 100 will now be described.

The device 100 is an information processing apparatus (terminal apparatus) capable of using an information presentation service provided by the server apparatus 200 and is, for example, a smartphone, a tablet, a PC, or a TV set. The information presentation service is a service to provide to the user the presentation information (described in detail below) used for proposing an action for relieving the fatigue in the free time when it is estimated that the degree of fatigue of the user is high.

The device 100 includes an input unit 101, a notification unit 102, a storage unit 103, a transmission and reception unit 104, and an information processing unit 105.

The input unit 101 is an input device, such as buttons or a touch panel.

The notification unit 102 is a display device, such as a display, or an output device, such as a speaker.

The storage unit 103 is a storage device, such as a memory or a hard disk unit.

For example, the storage unit 103 stores schedule information registered by the user of the device 100 (such schedule information is hereinafter referred to as the user schedule information). The user schedule information is, for example, the schedule information registered in an application (for example, a scheduler, a calendar application, or a notebook application) with which the user is capable of arbitrarily registering an event or the like for each date and time. The user schedule information is transmitted to the server apparatus 200 along with the user position information described below and is stored in a storage unit 203 in the server apparatus 200. The user schedule information will be described in detail below with reference to FIG. 4.

In addition, for example, the storage unit 103 stores the presentation information received from the server apparatus 200.

The transmission and reception unit 104 is a communication interface that transmits information to another apparatus and receives information transmitted from another apparatus.

For example, the transmission and reception unit 104 acquires the user position information at certain intervals. The user position information is, for example, acquired from a Global Positioning System (GPS) satellite (not illustrated) by the transmission and reception unit 104 and indicates the current position of the device 100.

In addition, for example, the transmission and reception unit 104 transmits the user schedule information and the user position information to the server apparatus 200 at certain intervals.

Furthermore, for example, the transmission and reception unit 104 receives the presentation information from the server apparatus 200.

The information processing unit 105 is a control device, such as a processor, which performs a variety of information processing.

For example, the information processing unit 105 causes the transmission and reception unit 104 to acquire the user position information at certain intervals, reads out the user schedule information from the storage unit 103, and causes the transmission and reception unit 104 to transmit the user schedule information and the user position information to the server apparatus 200.

In addition, for example, after temporarily storing the presentation information received from the server apparatus 200 by the transmission and reception unit 104 in the storage unit 103, the information processing unit 105 reads out the presentation information at certain timing and causes the notification unit 102 to display the presentation information.

The device 100 has the configuration described above.

An exemplary configuration of the server apparatus 200 will now be described.

The server apparatus 200 is an information processing apparatus that generates the presentation information on the basis of the information from the device 100 and information from the server apparatus 300 and transmits the presentation information to the device 100 to provide the information presentation service to the user.

The server apparatus 200 includes a transmission and reception unit 201, a determination unit 202, the storage unit 203, and a generation unit 204.

The transmission and reception unit 201 is a communication interface that transmits information to another apparatus and receives information transmitted from another apparatus.

For example, the transmission and reception unit 201 receives the user schedule information and the user position information from the device 100.

In addition, for example, the transmission and reception unit 201 transmits the user position information and request information for requesting transmission of the shop schedule information to the server apparatus 200 (hereinafter referred to as the request information for the shop schedule information) to the server apparatus 300. The transmission and reception unit 201 receives the shop schedule information and the shop position information corresponding to the request information for the shop schedule information from the server apparatus 300.

The shop schedule information (an example of facility schedule information) indicates the free time when the user is capable of using a service for relieving the fatigue (for example, a relaxation service) in a facility that provides the service. For example, the shop schedule information includes the information about the free time of each massager, which is registered by a staff or the like in the massager shop. The shop schedule information will be described in detail below with reference to FIG. 5. The service is exemplified by the massage and the shop is exemplified by the massage shop in the following description.

The shop position information (an example of facility position information) indicates the position of the shop (for example, position information used in the GPS). For example, the shop position information is registered in the server apparatus 300 in association with the shop schedule information.

Furthermore, for example, the transmission and reception unit 201 transmits the presentation information generated by the generation unit 204 to the device 100.

The determination unit 202 is a control device, such as a processor, which performs a variety of information processing.

For example, after temporarily storing the user schedule information and the user position information received from the device 100 by the transmission and reception unit 201 in the storage unit 203 in association with each other, the determination unit 202 reads out the user schedule information and a certain threshold value (the value used in a process of determining the degree of fatigue described below) at certain timing. Then, the determination unit 202 calculates the degree of fatigue of the user (hereinafter simply referred to as a "degree of fatigue") during a certain period on the basis of an event registered in the user schedule information. A process of calculating the degree of fatigue will be described in detail below.

Then, for example, the determination unit 202 determines whether the calculated degree of fatigue is higher than or equal to the threshold value. If the determination indicates that the degree of fatigue is higher than or equal to the threshold value, the determination unit 202 reads out the user position information from the storage unit 203 and causes the transmission and reception unit 201 to transmit the user position information that is read out and the request information for the shop schedule information to the server apparatus 300.

Then, for example, the determination unit 202 stores the shop schedule information and the shop position information, which are received from the server apparatus 300 by the transmission and reception unit 201, in the storage unit 203. Then, the determination unit 202 instructs the generation unit 204 to generate the presentation information.

The storage unit 203 is a storage device, such as a memory or a hard disk unit.

For example, the storage unit 203 stores the user schedule information and the user position information received by the transmission and reception unit 201.

In addition, for example, the storage unit 203 stores the shop schedule information and the shop position information received by the transmission and reception unit 201.

Furthermore, for example, the storage unit 203 stores the threshold value described above, which is used in the process of determining the degree of fatigue.

The generation unit 204 is a control device, such as a processor, which performs a variety of information processing.

For example, upon reception of an instruction to generate the presentation information from the determination unit 202, the generation unit 204 reads out the user schedule information, the shop schedule information, and the shop position information from the storage unit 203. Then, for example, the generation unit 204 searches for a time period in which the free time of the user included in the user schedule information (hereinafter referred to as a user free time) is overlapped with the free time of the shop included in the shop schedule information (hereinafter referred to as a shop free time) for a certain time or more (such a time period is hereinafter referred to as a common free time). The common free time is, for example, a time after the current time, which is closest to the current time. A process of searching for the common free time will be described in detail below.

Then, for example, the generation unit 204 generates the presentation information on the basis of information about a user identifier (ID) included in the user schedule information, a shop name included in the shop schedule information, the content of a coupon, the shop free time (the common free time that is searched for), the massager name associated with the shop free time, an image of the massager, and the position of the shop indicated by the shop position information. The presentation information generated here has, for example, the content in which the user is proposed to visit the massage shop in the common free time. A process of generating the presentation information will be described in detail below.

Then, for example, the generation unit 204 causes the transmission and reception unit 201 to transmit the generated presentation information to the device 100.

The server apparatus 200 has the configuration described above.

An exemplary configuration of the server apparatus 300 will now be described.

The server apparatus 300 is an information processing apparatus that transmits the shop schedule information and the shop position information to the server apparatus 200 in response to a request from the server apparatus 200.

The server apparatus 300 includes a transmission and reception unit 301, an information processing unit 302, and a storage unit 303.

The transmission and reception unit 301 is a communication interface that transmits information to another apparatus and receives information transmitted from another apparatus.

For example, the transmission and reception unit 301 receives the user position information and the request information for the shop schedule information from the server apparatus 200.

In addition, for example, the transmission and reception unit 301 transmits the shop schedule information and the shop position information to the server apparatus 200.

The information processing unit 302 is a control device, such as a processor, which performs a variety of information processing.

For example, upon reception of the user position information and the request information for the shop schedule information from the server apparatus 200 by the transmission and reception unit 301, the information processing unit 302 temporarily stores the user position information in the storage unit 303 and, then, reads out the user position information at certain timing. In addition, the information processing unit 302 reads out the shop schedule information and the shop position information from the storage unit 303. The shop schedule information and the shop position information are stored in the storage unit 303 in association with each other and are registered for every shop. Then, for example, the information processing unit 302 searches for the shop position information existing in a certain area around the user position information (for example, within 1 km from the user position information). The information processing unit 302 may search for all the pieces of shop position information in the certain area or may search for one piece of shop position information closest to the user position information, among the pieces of shop position information in the certain area.

Then, for example, the information processing unit 302 causes the transmission and reception unit 301 to transmit the shop position information that is searched for and the shop schedule information associated with the shop position information to the server apparatus 200.

The storage unit 303 is a storage device, such as a memory or a hard disk unit.

For example, the storage unit 303 stores the user position information received by the transmission and reception unit 301.

In addition, for example, the storage unit 303 stores the shop schedule information and the shop position information about each shop in association with each other.

The server apparatus 300 has the configuration described above.

<Operation of Server Apparatus 200>

Figure 3:
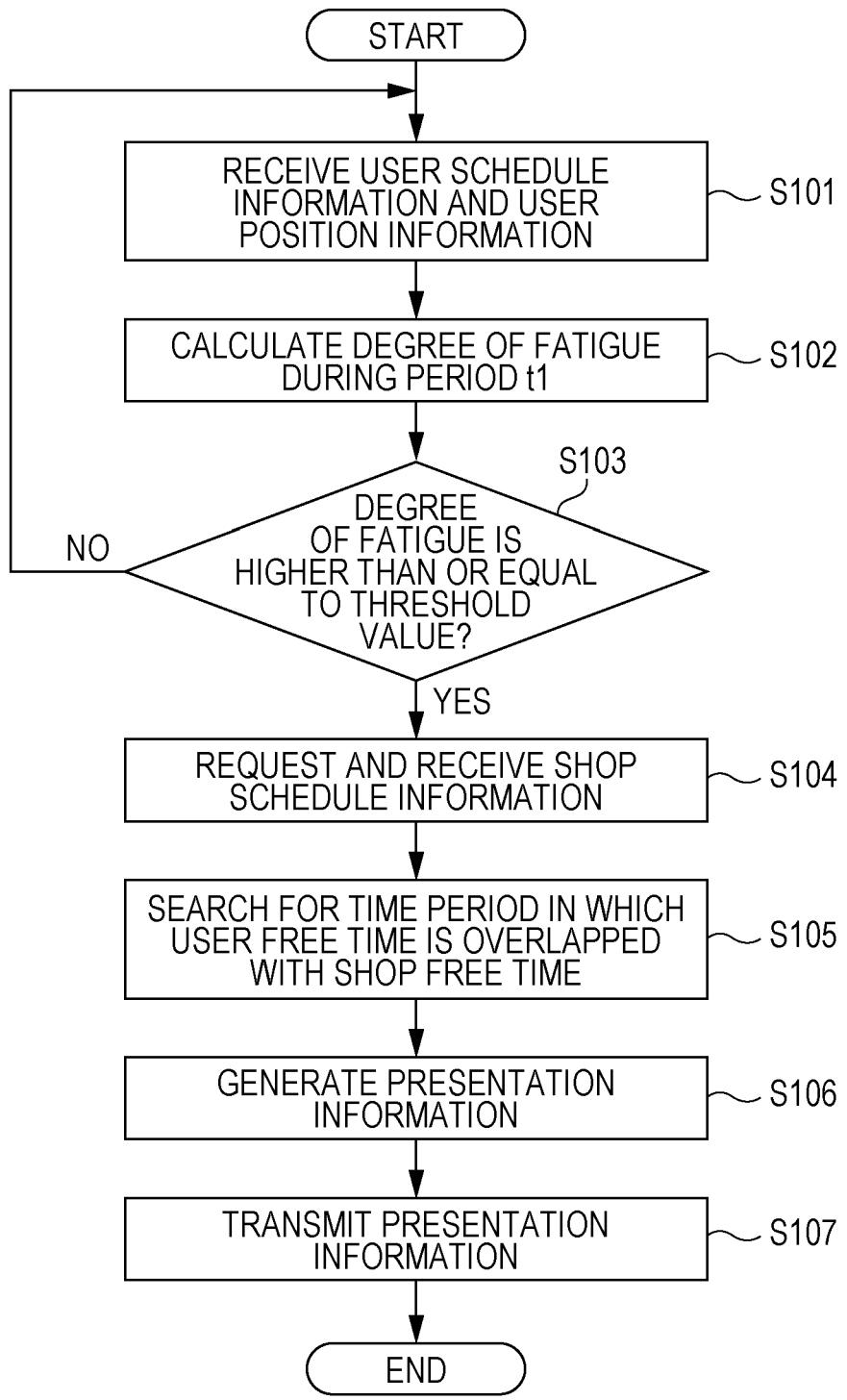
FIG. 3 is a flowchart illustrating an exemplary operation of a server apparatus according to the embodiment of the present disclosure.

An exemplary operation of the server apparatus 200 in the information presenting system according to the present embodiment will now be described with reference to FIG. 3. FIG. 3 is a flowchart illustrating the exemplary operation of the server apparatus 200 in the present embodiment.

Referring to FIG. 3, in Step S101, the transmission and reception unit 201 receives the user schedule information and the user position information from the device 100. The determination unit 202 temporarily stores the user schedule information and the user position information in the storage unit 203.

Figure 4:
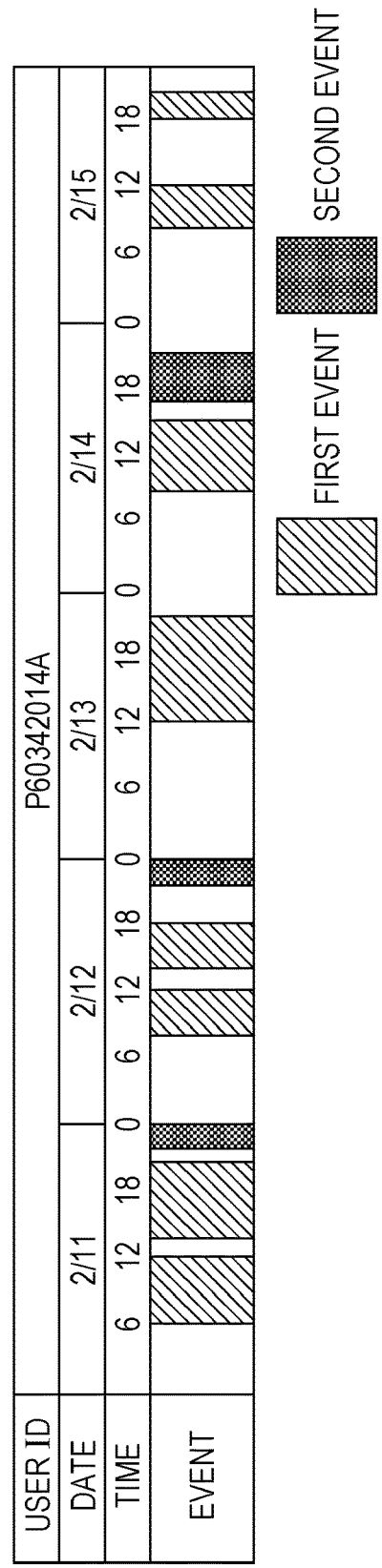
FIG. 4 is a diagram for describing exemplary information included in user schedule information according to the embodiment of the present disclosure.

An example of the user schedule information will now be described with reference to FIG. 4. FIG. 4 is a diagram for describing exemplary information included in the user schedule information that is received by the transmission and reception unit 201 and, then, is stored in the storage unit 203.

Referring to FIG. 4, the user schedule information includes information about a user ID, dates, times, and events.

The user ID is used to identify the user of the device 100, who is capable of using the information presentation service. The user ID is stored in advance, for example, in the storage unit 203 in association with the user name. The user ID is used in the example in FIG. 4, the user name may be used.

The dates and the times indicate the dates and times when the events are scheduled. The dates include the corresponding year although not illustrated in FIG. 4.

The events are scheduled actions of the user, which are registered in association with the dates and the times. Although the events are not illustrated in detail in the example in FIG. 4, for example, text information indicating the content of each event is registered for each date and time. The multiple events registered in the above manner are grouped into a first event and a second event by the determination unit 202, as illustrated in the example in FIG. 4. A process of identifying the events will be described below. The first event is an event, such as a work, in which the fatigue is easy to accumulate while the second event is an event, such as a play, in which the fatigue is difficult to accumulate. Blanks that do not correspond to the first event and the second event in the example in FIG. 4 are recognized by the determination unit 202 as the user free times.

The schedule information about five days from February 11 to February 15 is indicated in the example in FIG. 4.

The example of the user schedule information is described above.

Referring back to FIG. 3, in Step S102, the determination unit 202 reads out the user schedule information illustrated in FIG. 4 and the threshold value used in a determination process in Step S103 described below from the storage unit 203. Then, the determination unit 202 calculates the degree of fatigue during a certain period t1 on the basis of the user schedule information.

An example of the process of calculating the degree of fatigue will now be described with reference to FIG. 4.

First, the determination unit 202 determines whether each event registered during the certain period t1 before a certain time (for example, the current time) is the first event or the second event. For example, if the registered event includes the text information about a "work", a "business trip", a "meeting", a "business entertainment", etc., the determination unit 202 recognizes that the event is the first event. If the registered event includes the text information about a "meal", a "shopping", a "lesson", etc. or the text information indicating a "resort", a "recreational facility", etc., the determination unit 202 recognizes that the event is the second event. The determination criterion of such determination is set by, for example, a manager or the like of the server apparatus 200 in advance. The certain time and the certain period t1 are also set by, for example, the manager or the like of the server apparatus 200 in advance. The determination unit 202 recognizes the times that do not correspond to the first event and the second event as the user free times.

Then, the determination unit 202 calculates the total time of the first events and the total time of the second events. For example, when the certain time is the current time: 11:00 on February 15 and the certain period t1 is 96 hours (four days), the determination unit 202 calculates the total time of the first events and the total time of the second events, which are registered from 11:00 on February 11 to 11:00 on February 15. The certain time may be a time after the current time or may be a time before the current time. The certain period t1 may be a period longer than four days or may be a period shorter than four days.

Then, the determination unit 202 assigns a certain weight to the total time of the first events, assigns a certain weight to the total time of the second events, and sums up the weighted total time of the first events and the weighted total time of the second events. For example, the determination unit 202 sums up the value resulting from multiplication of the total time of the first events by a certain value (for example, 1.0) and the value resulting from multiplication of the total time of the second events by a certain value (for example, 0.5). The determination unit 202 determines the calculated sum to be the degree of fatigue.

Grouping the events registered in the user schedule information into the first event and the second event and weighting the first event and the second event in the above manner allows the degree of fatigue of the user to be appropriately calculated.

The process of calculating the degree of fatigue is described above.

Referring back to FIG. 3, in Step S103, the determination unit 202 determines whether the calculated degree of fatigue is higher than or equal to the threshold value read out from the storage unit 203. The threshold value is set in advance, for example, for each user or for each attribute (for example, the age or the physical condition) of the user. The threshold value is set in advance by, for example, the manager or the like of the server apparatus 200 or the user.

If the determination unit 202 determines that the degree of fatigue is lower than the threshold value (NO in Step S103), the determination unit 202 estimates that the degree of fatigue is low. In this case, the process goes back to Step S101. If the determination unit 202 determines that the degree of fatigue is higher than or equal to the threshold value (YES in Step S103), the determination unit 202 estimates that the degree of fatigue is high. In this case, the process goes to Step S104.

In Step S104, the determination unit 202 reads out the user position information from the storage unit 203 and causes the transmission and reception unit 201 to transmit the user position information and the request information for the shop schedule information to the server apparatus 300. Since the process in the server apparatus 300 based on the request information is described above, a description of the process in the server apparatus 300 is omitted herein. Upon reception of the shop schedule information and the shop position information from the server apparatus 300 by the transmission and reception unit 201, the determination unit 202 temporarily stores the shop schedule information and the shop position information in the storage unit 203. The determination unit 202 instructs the generation unit 204 to generate the presentation information.

An example of the shop schedule information will now be described with reference to FIG. 5. FIG. 5 illustrates the example of the shop schedule information that is received by the transmission and reception unit 201 and, then, is stored in the storage unit 203.

Referring to FIG. 5, the shop schedule information includes information about a shop name, the content of a coupon, massager names, image names, and the shop free times.

The shop name is the name of a massage shop.

The content of a coupon indicates the content of a benefit to be given to the user. Although the benefit is exemplified by a discount in the example in FIG. 5, the benefit is not limited to the discount. For example, the benefit may be a treatment or an article which the user is capable of receiving with no charge.

The massager names are the names of massagers belonging to the shop.

The image names are the names of pieces of image information on the massagers (identification information). The image information on each massager may be, for example, a picture of the face or the upper body of the massager or a portrait of the massager. The image information on each massager (hereinafter referred to as a massager image) is stored in the storage unit 203 in association with the image name, although not illustrated in FIG. 5.

The shop free times are the free times (for example, times with no reservation) of each massager.

The example of the shop schedule information is described above.

Referring back to FIG. 3, upon reception of the instruction to generate the presentation information from the determination unit 202, in Step S105, the generation unit 204 reads out the user schedule information illustrated in FIG. 4, the shop schedule information illustrated in FIG. 5, and the shop position information associated with the shop schedule information from the storage unit 203. The generation unit 204 searches for the time period (the common free time) in which the user free time included in the user schedule information is overlapped with the shop free time included in the shop schedule information for a certain time or more.

An example of the process of searching for the common free time will now be described with reference to FIG. 4 and FIG. 5.

First, the generation unit 204 searches the user free times recognized in the process of calculating the degree of fatigue described above in the user schedule information illustrated in FIG. 4 for a time period after the current time, which is closest to the current time. For example, when the current time is 11:00 on February 15 in the example in FIG. 5, a time period from 12:00 to 18:00 on February 15 is detected through the search by the generation unit 204.

Then, the generation unit 204 searches the shop free times registered in the shop schedule information illustrated in FIG. 5 for a time period overlapped with the user free time for a certain time or more. The certain time is, for example, an approximate time resulting from addition of the time required for the user to move the shop to the time required for the massage. For example, when the certain time is set to two hours and the user free time is 12:00 to 18:00 on February 15, the generation unit 204 determines 14:00 to 16:00 on February 15, among the shop free times illustrated in FIG. 5, to be the common free time.

The example of the process of searching for the common free time is described above.

Referring back to FIG. 3, in Step S106, the generation unit 204 generates the presentation information on the basis of the user schedule information, the shop schedule information, and the shop position information.

An example of the process of generating the presentation information will now be described with reference to FIG. 4 and FIG. 5.

First, the generation unit 204 extracts the information about the user ID from the user schedule information illustrated in FIG. 4. The generation unit 204 reads out the information about the user name associated with the extracted user ID from the storage unit 203. In addition, the generation unit 204 extracts the information about the shop name, the content of the coupon, the shop free time searched for as the common free time, the massager name associated with the shop free time, and the image name from the shop schedule information illustrated in FIG. 5. The generation unit 204 reads out the massager image associated with the extracted image name from the storage unit 203.

Then, the generation unit 204 generates a message (for example, refer to a message 602 illustrated in FIG. 6B) including the information about the user name that is read out and the shop name, the shop free time, and the massager name which are extracted. This message may be generated so as to include the pieces of information that are extracted in template message information stored in the storage unit 203 in advance. The message generated in the above manner has the content prompting the user to visit the massage shop in the common free time.

In addition, the generation unit 204 generates a map (for example, refer to a map 605 illustrated in FIG. 6B) including the position of the shop indicated by the shop position information. For example, the generation unit 204 generates the map with the shop position information included in map information used in a map application.

Figure 6B:
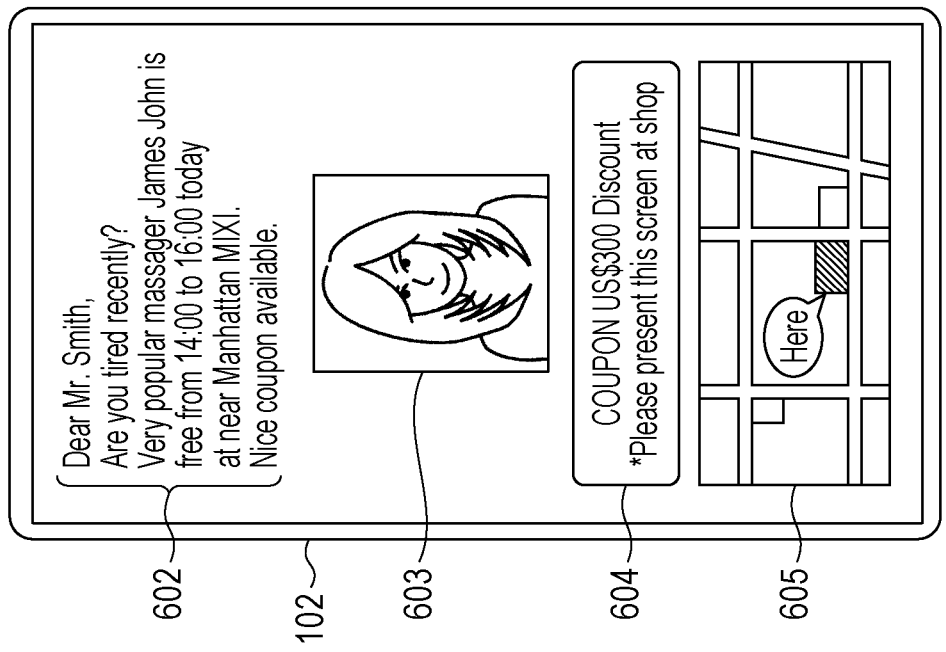
FIGS. 6A and 6B illustrate examples of how presentation information is displayed according to the embodiment of the present disclosure.

Then, the generation unit 204 generates the image information including the information about the message and the map that are generated, the massager image that is read out (for example, refer to an image 603 illustrated in FIG. 6B), and the content of the coupon which is extracted (for example, refer to a coupon 604 illustrated in FIG. 6B). This image information is presented to the user as the presentation information.

Figure 6A:
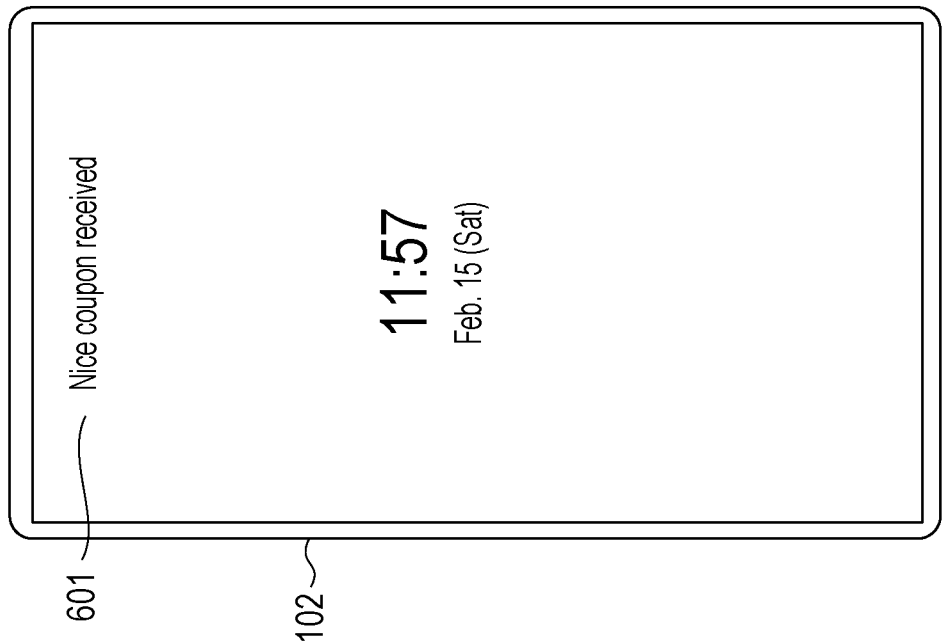

Furthermore, the generation unit 204 generates a notification message (for example, refer to a notification message 601 illustrated in FIG. 6A) notifying the user of reception of the presentation information. This notification message may be template message information stored in the storage unit 203 in advance.

The example of the process of generating the presentation information is described above.

Referring back to FIG. 3, in Step S107, the generation unit 204 causes the transmission and reception unit 201 to transmit the information about the generated notification image and the presentation information to the device 100. The presentation information may be transmitted, for example, using an electronic mail. Then, the presentation information is received by the device 100 for display. Since the process of displaying the presentation information in the device 100 is described above, a description of the process of displaying the presentation information in the device 100 is omitted herein.

Examples of how the presentation information is displayed in the device 100 will now be described with reference to FIGS. 6A and 6B. FIG. 6A illustrates an example of how the presentation information is displayed upon reception of the presentation information in the device 100. FIG. 6B illustrates an example of how the presentation information is displayed in the device 100.

As illustrated in FIG. 6A, upon reception of the presentation information by the device 100, the notification message 601 is displayed in, for example, an upper portion of the notification unit 102. The presentation information illustrated in FIG. 6B is displayed in the notification unit 102 in response to a user's operation to instruct the display of the presentation information.

As illustrated in FIG. 6B, an image including the message 602, the massager image 603, the coupon 604, and the map 605 is displayed in the notification unit 102.

As described above, according to the present embodiment, it is possible to propose the action for relieving the fatigue in the free time to the user when it is estimated that the degree of fatigue of the user is high. In other words, the action in the free time is appropriately proposed in consideration of the degree of fatigue of the user in the present embodiment. For example, as described above, when the server apparatus 200 determines that the degree of fatigue of the user is high and the user is prompted to visit the massage shop in the free time, the user is capable of receiving the service in the massage shop immediately when the fatigue is accumulated. In addition, the massage shop is capable of increasing the operating rate of the free times of the shop.

<Modifications>

Although the embodiments of the present disclosure are described above, various changes and modifications may be made to the disclosure without departing from the spirit and scope thereof. The modifications of the embodiments described above will now be described.

(First Modification)

The search for the shop position information in the server apparatus 300 may be performed by the server apparatus 200. In this case, first, the server apparatus 300 transmits the shop schedule information and the shop position information to the server apparatus 200 at certain intervals. Then, the determination unit 202 in the server apparatus 200 stores the shop schedule information and the shop position information from the server apparatus 300 in the storage unit 203. Then, the determination unit 202 searches the pieces of shop position information stored in the storage unit 203 for the shop position information existing in a certain area around the user position information received from the device 100. Then, the determination unit 202 supplies the shop position information that is searched for and the shop schedule information associated with the shop position information to the generation unit 204 to instruct the generation unit 204 to generate the presentation information. The generation unit 204 generates the presentation information described above on the basis of the user schedule information read out from the storage unit 203 and the shop position information and the shop schedule information supplied from the determination unit 202.

(Second Modification)

The search for the shop position information in the server apparatus 300 may be performed by the server apparatus 200. In this case, for example, the server apparatus 300 transmits the shop schedule information and the shop position information to the server apparatus 200 at certain intervals. Alternatively, for example, the manager or the like of the server apparatus 200 may input the shop schedule information and the shop position information in the server apparatus 200. Then, the determination unit 202 in the server apparatus 200 stores the shop schedule information and the shop position information in the storage unit 203. Then, the determination unit 202 searches the pieces of shop position information stored in the storage unit 203 for the shop position information about the shop specified in advance by the user of the device 100. The subsequent processing is the same as that in the first modification described above.

(Third Modification)

The process of generating the presentation information may be performed without using the shop schedule information and the shop position information in the second modification. Specifically, the matching between the user free time and the shop free time may not be performed in the generation of the presentation information. In this case, upon reception of the instruction to generate the presentation information from the determination unit 202, the generation unit 204 in the server apparatus 200 reads out the user schedule information and the template message information from the storage unit 203. The template message information is stored in the storage unit 203 in advance and indicates a sentence proposing the action for relieving the fatigue to the user (for example, a sentence "Are you tired recently? Let's go to the massage for refreshing). Then, the generation unit 204 searches the user free times after the current time, which are closest to the current time, in the user schedule information for the time period longer than or equal to a certain time. Then, the generation unit 204 generates the presentation information including the information about the user name associated with the user ID and the time period that is searched for and the message information. The generation unit 204 causes the transmission and reception unit 201 to transmit the presentation information to the device 100. As a result, for example, a message "Dear Mr. Smith, are you tired recently? Let's go to the massage for refreshing from 14:00 to 18:00." is displayed in the notification unit 102 in the device 100. "Mr. Smith" in the message is the user name associated with the user ID and "from 14:00 to 18:00 in the message is the time period that is searched for.

(Fourth Modification)

The user position information used in the search for the shop position information by the server apparatus 300 may be information indicating a future position of the user (the position where the user will exist in an event after the current time), instead of the information indicating the current position of the user. For example, first, the determination unit 202 in the server apparatus 200 searches the user schedule information received from the device 100 for the user free time after the current time. Then, the determination unit 202 extracts the text information indicating a place name or an address if the text information is included in the event (the first event or the second event) which is registered before or after the user free time that is searched for and which is adjacent to the user free time that is searched for. Then, the determination unit 202 transmits the extracted text information to another server apparatus that stores the text information indicating the place name or the address and the position information in association with each other via the transmission and reception unit 201. Then, the transmission and reception unit 201 receives the position information searched for in the other server apparatus from the other server apparatus. The position information indicates the future position of the user. Then, the determination unit 202 transmits the position information and the request information for the shop schedule information to the server apparatus 300 via the transmission and reception unit 201. The subsequent operations are the same as those in the above embodiments. As described above, according to the fourth modification, it is possible to propose to the user the visit to the shop close to the future position of the user in advance. The search for the shop position information in the server apparatus 300 in the fourth modification may be performed by the server apparatus 200, as described above in the first modification.

(Fifth Modification)

The determination unit 202 in the server apparatus 200 may assign a minus weight to an event (hereinafter referred to as a third event) in which the fatigue can be relieved, among the second events, in the calculation of the degree of fatigue. The third event is, for example, an event in which the user receives the relaxation service. For example, first, the determination unit 202 determines whether the event registered in the user schedule information is the first event, the second event, or the third event. Specifically, the determination unit 202 recognizes the event including the text information indicating the name of the massage shop or the like, among the second events, as the third event. Then, the determination unit 202 calculates the total time of the first events, the total time of the second events, and the total time of the third events. Then, the determination unit 202 assigns different plus weights (for example, 1.0 and 0.5) to the total time of the first events and the total time of the second events and assigns a minus weight (for example, −0.5) to the total time of the third events. Then, the determination unit 202 sums up the three values resulting from the weighting and determines the sum to be the degree of fatigue. Assigning a minus weight to the event in which the fatigue can be relieved in the above manner allows the degree of fatigue to be more appropriately calculated.

(Sixth Modification)

The criterion of the determination of whether the event registered in the schedule information is identified as the first event or the second event by the determination unit 202 may be varied by the user, in addition to the manager or the like of the server apparatus 200. The information about the criterion of the determination is stored in the storage unit 203. The determination unit 202 reads out the information about the criterion of the determination from the storage unit 203 in the calculation of the degree of fatigue and determines whether the event registered in the user schedule information is the first event or the second event on the basis of the information that is read out.

(Seventh Modification)

The threshold value used in the determination of the degree of fatigue may be sequentially varied by learning. For example, first, the determination unit 202 in the server apparatus 200 searches the second events registered before the current time in the user schedule information received from the device 100 for the event in which it is estimated that the user has performed the action for relieving the fatigue. For example, the determination unit 202 searches the second events for the event including the text information about the name of the massage shop or the like. Then, the determination unit 202 determines whether each event registered during the certain period t1 before the start time of the event that is searched for is the first event or the second event. Then, the determination unit 202 calculates the total time of the first events and the total time of the second events, assigns different certain weights to the respective calculated total times, and sums up the results of the weighting, as described in the above embodiments. Then, the determination unit 202 determines the sum to be the threshold value used in the subsequent determination of the degree of fatigue and overwrites the threshold value stored in the storage unit 203 with the determined threshold value for storage.

(Eighth Modification)

The determination unit 202 in the server apparatus 200 may calculate the total time of the user free times in the user schedule information, instead of the calculation of the degree of fatigue on the basis of the times of the events registered in the user schedule information, and may determine that the degree of fatigue of the user is high if the total time of the user free times is lower than or equal to a certain threshold value.

(Ninth Modification)

The determination unit 202 in the server apparatus 200 may calculate the degree of fatigue on the basis of a medical measurement value indicating the physical or mental state of the user acquired from another apparatus or may directly use the above state information acquired from the other apparatus as the degree of fatigue, instead of the calculation of the degree of fatigue on the basis of the times of the events registered in the user schedule information. The other apparatus is, for example, an activity monitor, a stress monitor, or a medical device. The values measured by the medical device include a blood pressure level and a heart rate.

(Tenth Modification)

The timing when the server apparatus 200 transmits the presentation information to the device 100 may be the current time, may be the start time of the time period that is searched for (the common free time), or may be a time a certain time (for example, five minutes) before the start time.

(Eleventh Modification)

It is sufficient for the presentation information to include, for example, the message 602 in the example in FIG. 6B. The massager image 603, the coupon 604, and the map 605 may not be included in the presentation information.

(Twelfth Modification)

The shop providing the relaxation service, which is exemplified as the service for relieving the fatigue in the above embodiments, is not limited to the massage shop and may be a sauna, a hot spring, or a hotel. The service for relieving the fatigue is not limited to the relaxation service and may be a facility, such as a theme park or a movie, providing an entertainment service.

(Thirteenth Modification)

Although the case is exemplified in the above embodiments in which the service provider provides the service to the user in the shop to which the service provider belong, the mode of the provision of the service is not limited to this. For example, the service may be provided in a mode in which the service provider goes to a place specified by the user or the service provider and provides the service to the user at the place. In this case, for example, the "shop schedule information" illustrated in FIG. 5 may be put into "service provider schedule information." For example, the "shop free time" illustrated in FIG. 5 may be put into a "service provider free time."

The modifications of the embodiments are described above. The modifications may be arbitrarily combined.

<Example of Realization with Computer Program>

The functions of the device 100, the server apparatus 200, the server apparatus 300 (hereinafter referred to as the respective apparatuses) according to the embodiments of the present disclosure, which are described above with reference to the drawings, may be realized with computer programs.

Figure 7:
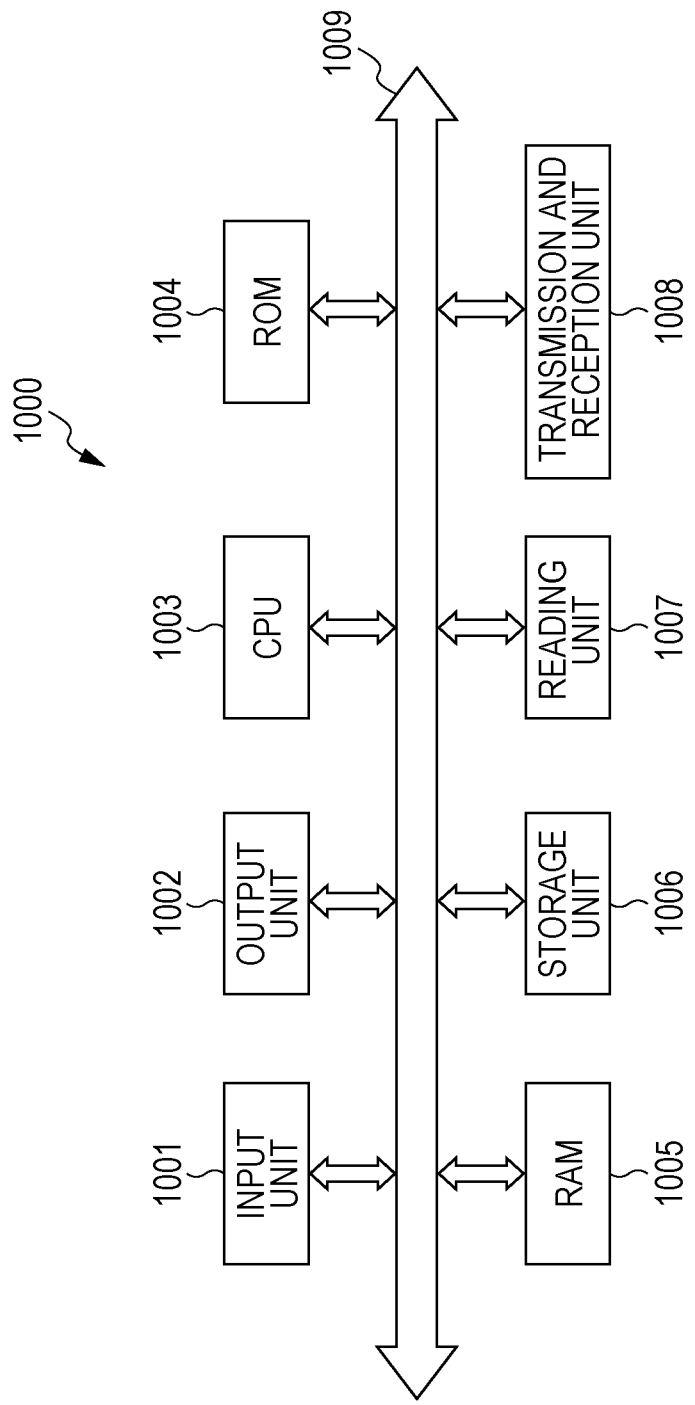
FIG. 7 illustrates an exemplary hardware configuration of a computer that realizes the functions of a device and server apparatuses with software according to the embodiment of the present disclosure.

FIG. 7 illustrates an exemplary hardware configuration of a computer that realizes the functions of the respective apparatuses with programs. Referring to FIG. 7, a computer 1000 includes an input unit 1001 including input buttons or a touch pad; an output unit 1002 including a display and a speaker; a central processing unit (CPU) 1003; a read only memory (ROM) 1004; a random access memory (RAM) 1005; a storage unit 1006, such as a hard disk unit or a solid state drive (SSD); a reading unit 1007 that reads out information from a recording medium, such as a digital versatile disk-read only memory (DVD-ROM) or a universal serial bus (USB) memory; and a transmission and reception unit 1008 that performs communication via a network. The above components are connected to each other via a bus 1009.

The reading unit 1007 reads out the programs from the recording medium on which the programs for realizing the functions of the components are recorded and stores the programs in the storage unit 1006. Alternatively, the transmission and reception unit 1008 communicates with a server apparatus connected to the network and stores the programs for realizing the functions of the components, which are downloaded from the server apparatus, in the storage unit 1006.

The CPU 1003 copies the programs stored in the storage unit 1006 to the RAM 1005, sequentially reads out instructions included in the programs from the RAM 1005, and executes the programs to realize the functions of the components. In the execution of the programs, the information acquired in the various processes described above in the embodiments is stored in the RAM 1005 or the storage unit 1006 and is appropriately used.

<Cloud Service Types>

The technologies described in the above embodiments may be realized in the following cloud service types. However, the types realizing the technologies described in the above embodiments are not limited to the following ones.

(First Service Type: Own Company's Data Center Type)

Figure 8:
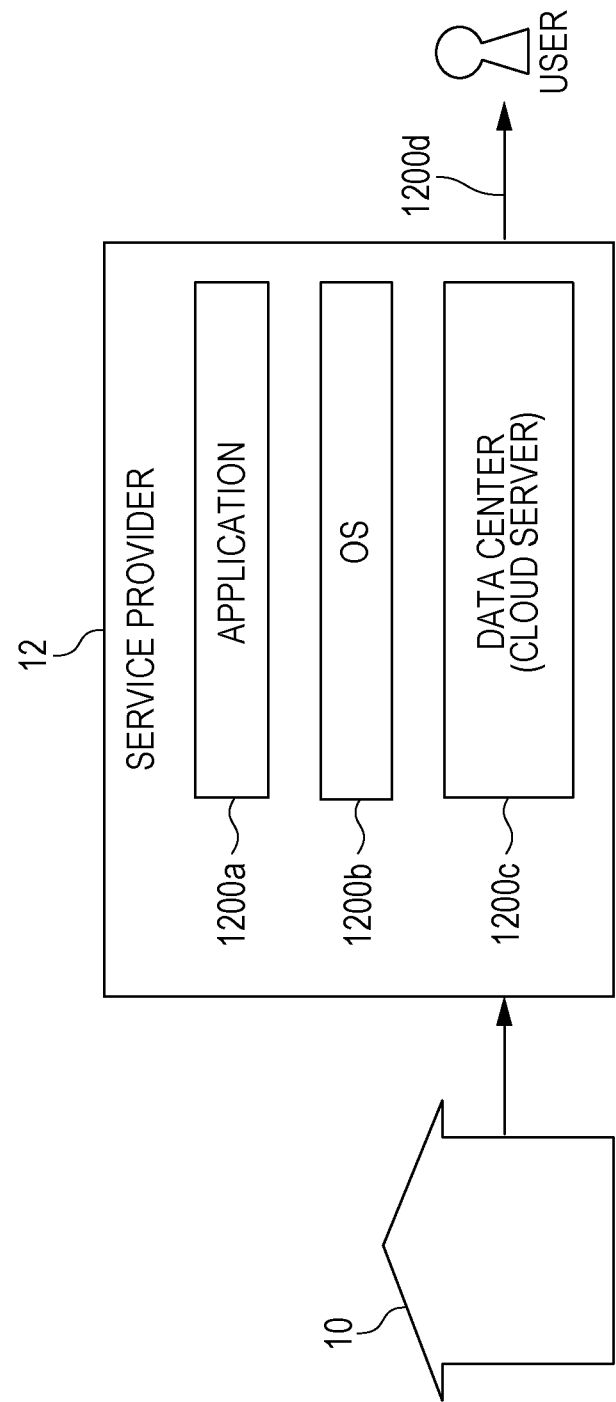
FIG. 8 illustrates a first service type (own company's data center type)

FIG. 8 illustrates a first service type (own company's data center type). In the first service type, the service provider 12 acquires information from the group 10 to provide the service to the user. The service provider 12 has the function of the data center operating company in the first service type. Specifically, the service provider 12 includes the cloud server 11a, which manages big data. Accordingly, the data center operating company does not exist in the first service type.

In the first service type, the service provider 12 operates and manages a data center 1200c (cloud server 11a). In addition, the service provider 12 manages an operating system (OS) 1200b and an application 1200a. The service provider 12 performs service provision 1200d using the OS 1200b and the application 1200a managed by the service provider 12.

(Second Service Type: IaaS Use Type)

Figure 9:
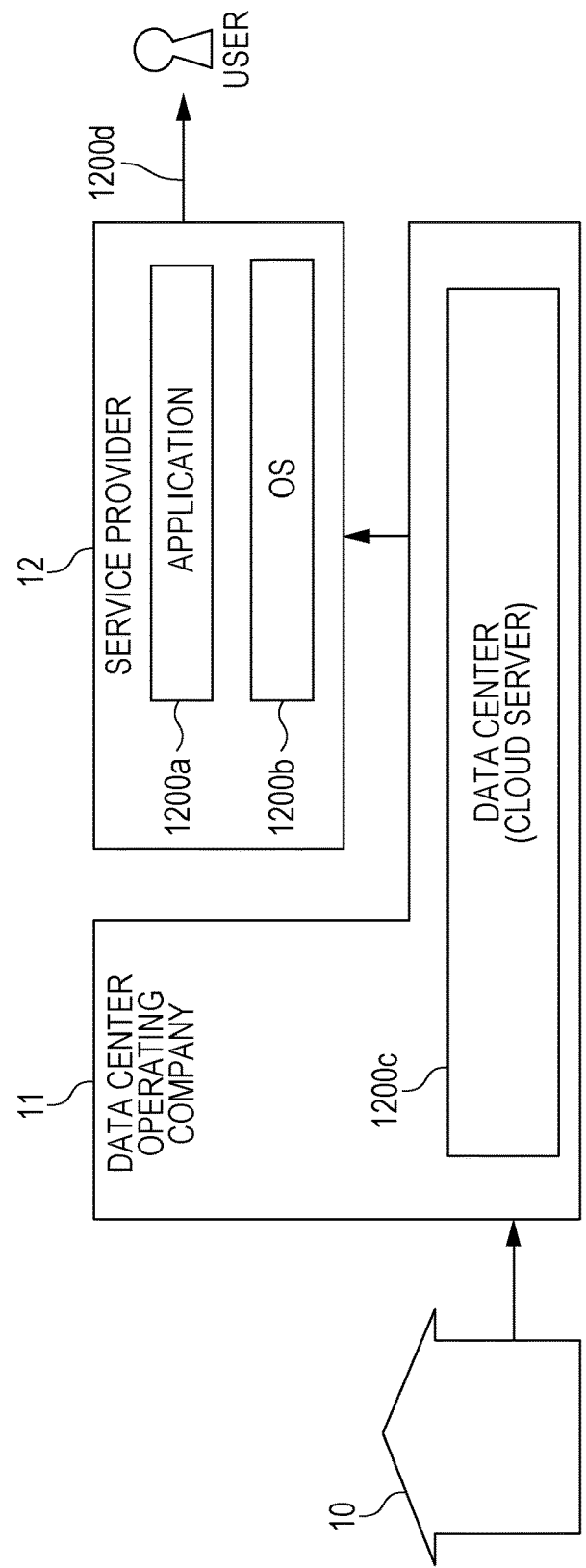
FIG. 9 illustrates a second service type (IaaS use type)

FIG. 9 illustrates a second service type (IaaS use type). IaaS is an abbreviation of Infrastructure as a Service and is a cloud service providing model that provides the infrastructure itself for building and operating a computer system as a service via the Internet.

In the second service type, the data center operating company 11 operates and manages the data center 1200c (the cloud server 11a). The service provider 12 manages the OS 1200b and the application 1200a. The service provider 12 performs the service provision 1200d using the OS 1200b and the application 1200a managed by the service provider 12.

(Third Service Type: PaaS Use Type)

Figure 10:
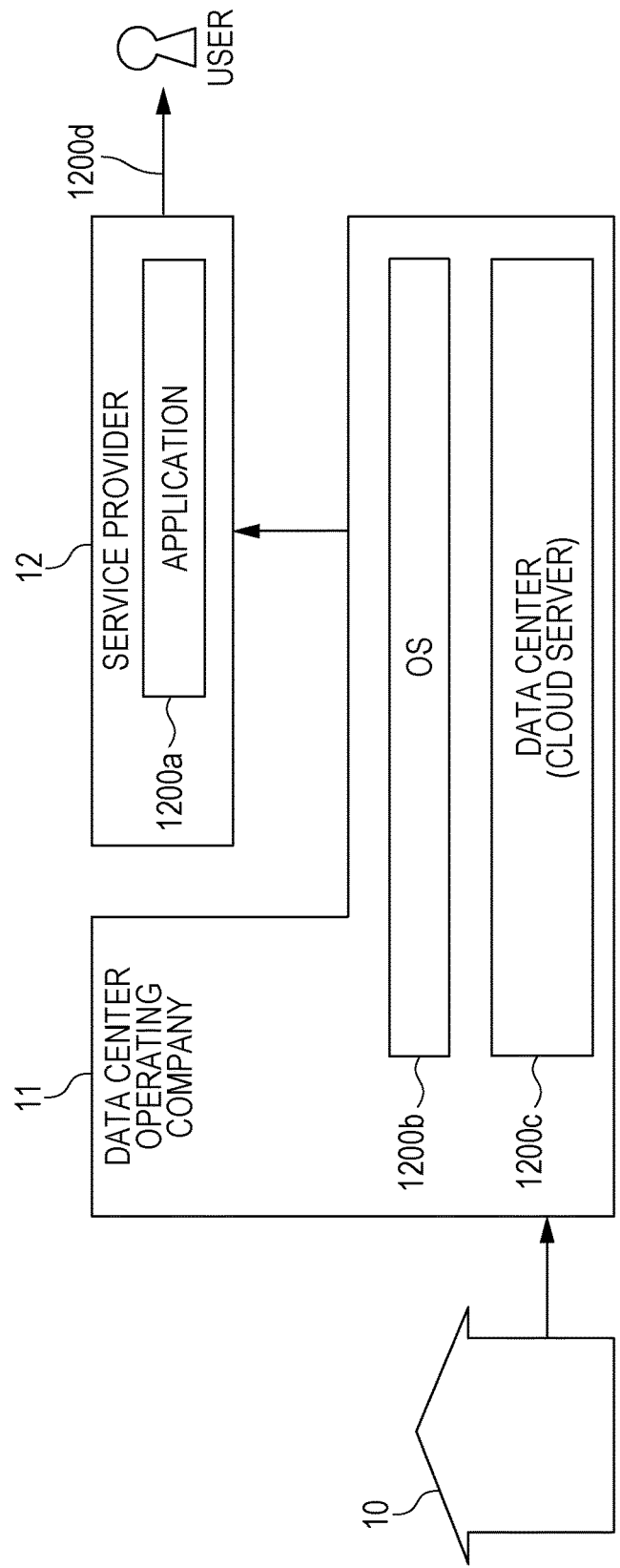
FIG. 10 illustrates a third service type (PaaS use type)

FIG. 10 illustrates a third service type (PaaS use type). PaaS is an abbreviation of Platform as a Service and is a cloud service providing model that provides a platform for building and operating software as a service via the Internet.

In the third service type, the data center operating company 11 manages the OS 1200b and operates and manages the data center 1200c (the cloud server 11a). The service provider 12 manages the application 1200a. The service provider 12 performs the service provision 1200d using the OS 1200b managed by the data center operating company 11 and the application 1200a managed by the service provider 12.

(Fourth Service Type: SaaS Use Type)

Figure 11:
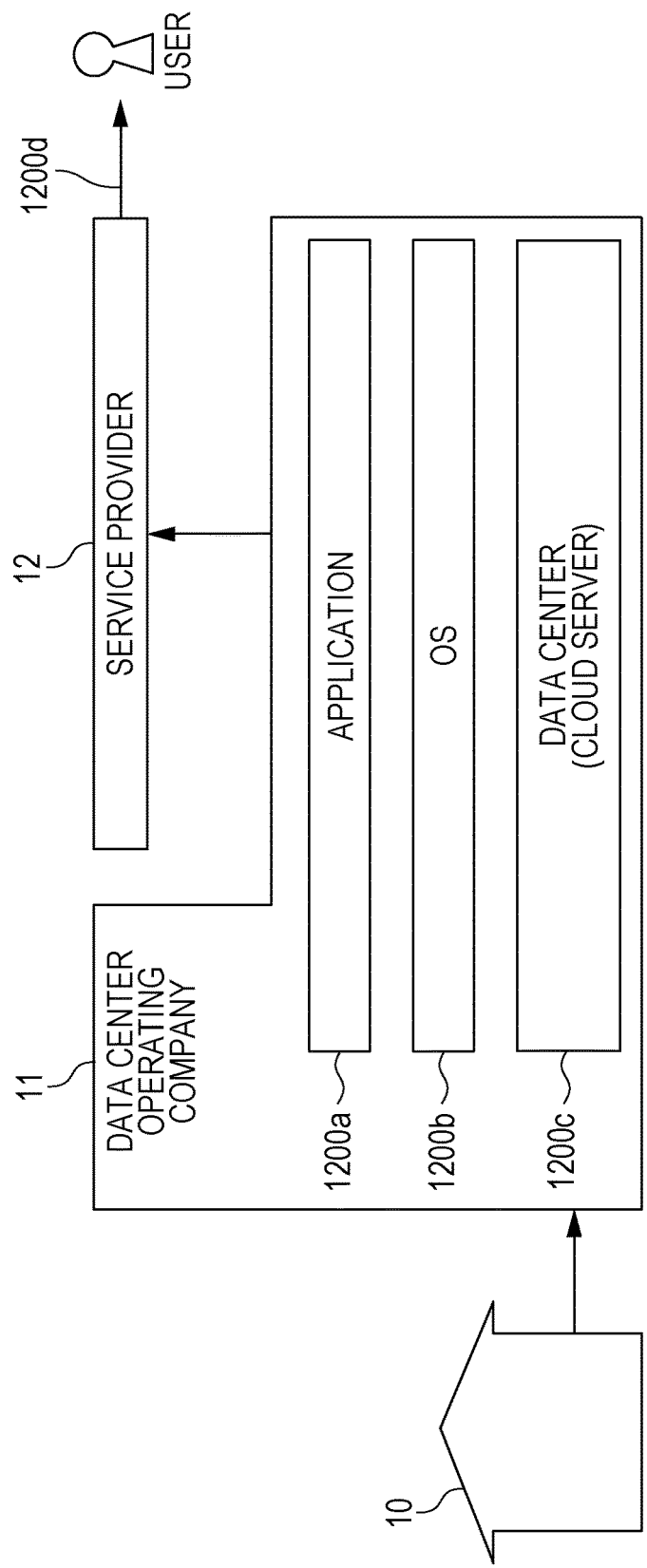
FIG. 11 illustrates a fourth service type (SaaS use type).

FIG. 11 illustrates a fourth service type (SaaS use type). SaaS is an abbreviation of Software as a Service. SaaS is a cloud service providing model having a function in which a company or a person (user) who does not hold the data center (the cloud server) can use an application provided by a platform provider who holds the data center (the cloud server) via a network, such as the Internet.

In the fourth service type, the data center operating company 11 manages the application 1200a, manages the OS 1200b, and operates and manages the data center 1200c (the cloud server 11a). The service provider 12 performs the service provision 1200d using the OS 1200b and the application 1200a managed by the data center operating company 11.

The service provider 12 performs the service providing action in all the service types. In addition, the service provider or the data center operating company may develop the OS, the application, or a database of the big data or may outsource the development of the OS, the application, or the database of the big data to a third party.

The present disclosure is preferably used in an information presenting method of presenting information in accordance with the schedule of the user.

What is claimed is:

1. An information presenting method of providing presentation information to a terminal apparatus, the information presenting method comprising:

acquiring, with a processor, user schedule information in which at least one event is scheduled by a user for each date and time;

determining whether each event scheduled in a certain period in the user schedule information belongs to a first event or a second event using information indicating whether each of the events belongs to the first event or the second event, wherein an event is recognized as a first event in response to the determining that the event information comprising a term from a set of terms predefined as related to work activities, and an event is recognized as a second event in response to the determining that the event information comprising a term from a set of terms predefined as not related to work activities;

calculating a first total time of the first event and a second total time of the second event;

assigning weight to the first total time of the first event by multiplying the first total time by a first value;

assigning weight to the second total time of the second event by multiplying the second total time by a second value, wherein the first value being greater than the second value;

calculating the degree of fatigue by adding a weighted total resulting from the multiplication of the first total time by the first value to a weighted total resulting from the multiplication of the second total time by the second value;

determining whether the calculated degree of fatigue is greater than or equal to a threshold value set for the user;

searching for a free time after a current time, in which no event is scheduled, on the basis of the user schedule information;

generating the presentation information about a service provider that provides a service for relieving fatigue of the user in the free time in response to a determination that the degree of fatigue is greater than or equal to the threshold value set for the user; and transmitting the presentation information to the terminal apparatus when the free time starts.

2. The information presenting method according to claim 1, wherein the information presenting method includes:

searching for a time period in which the free time that is searched for from the user schedule information overlaps an available free time with the service provider providing the service for at least a period of time using service provider schedule information indicating the available free time and the free time; and generating the presentation information including the information during the time period.

3. The information presenting method according to claim 2, wherein the information presenting method includes:

acquiring user position information indicating a current position of the user;

searching for service provider location information indicating a position of the service provider existing in a certain location around the current position of the user using the user position information; and searching for the time period for the service provider indicated by the service provider location information.

4. The information presenting method according to claim 1, wherein the service provider that provides the service for relieving the fatigue of the user comprises a massage shop.

* * * * *